United States Patent
Ocal et al.

(10) Patent No.: US 12,293,152 B1
(45) Date of Patent: May 6, 2025

(54) SYSTEMS AND METHODS FOR PERFORMING TEMPORAL ANALYSIS

(71) Applicants: Mustafa Ocal, Miami, FL (US); Mark Finlayson, Miami, FL (US)

(72) Inventors: Mustafa Ocal, Miami, FL (US); Mark Finlayson, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 18/882,352

(22) Filed: Sep. 11, 2024

(51) Int. Cl.
*G06F 40/30* (2020.01)
*G06F 40/205* (2020.01)
*G06F 40/279* (2020.01)

(52) U.S. Cl.
CPC .......... *G06F 40/279* (2020.01); *G06F 40/205* (2020.01)

(58) Field of Classification Search
CPC .... G06F 40/211; G06F 40/253; G06F 40/268; G06F 40/284; G06F 40/30
See application file for complete search history.

(56) References Cited

U.S. PATENT DOCUMENTS

| | | | |
|---|---|---|---|
| 7,412,643 B1 * | 8/2008 | Fischer | G06F 16/748 715/201 |
| 7,870,562 B1 * | 1/2011 | Hansen-Sturm | G06F 16/4387 719/314 |
| 11,170,303 B1 * | 11/2021 | Ocal | G06N 7/01 |
| 11,830,527 B2 * | 11/2023 | Silvestri | G11B 27/036 |
| 2011/0254664 A1 * | 10/2011 | Sadr | H04Q 9/00 340/10.1 |
| 2017/0177740 A1 * | 6/2017 | Abaya | G06F 16/22 |
| 2018/0367414 A1 * | 12/2018 | Raghavendra | H04Q 9/02 |
| 2019/0287302 A1 * | 9/2019 | Bhuruth | G06F 3/04847 |
| 2021/0194905 A1 * | 6/2021 | Fong | H04L 63/1425 |
| 2022/0129749 A1 * | 4/2022 | Moritz | G06N 3/082 |
| 2022/0303641 A1 * | 9/2022 | Kiyama | H04N 21/44012 |
| 2022/0406033 A1 * | 12/2022 | McIntosh | G06V 10/776 |
| 2023/0025009 A1 * | 1/2023 | Shah | H04N 23/631 |
| 2023/0033211 A1 * | 2/2023 | Ferreira Lima | G06F 40/295 |
| 2023/0126708 A1 * | 4/2023 | Wadhwa | G06N 20/20 705/44 |

(Continued)

OTHER PUBLICATIONS

MOffitt et al., Temporal Graph Algebra, booktitle={Proceedings of The 16th International Symposium on Database Programming Languages}, pp. ={1-12}, year={2017} (Year: 2017).*

(Continued)

*Primary Examiner* — Lamont M Spooner
(74) *Attorney, Agent, or Firm* — SALIWANCHIK, LLOYD & EISENSCHENK (57) ABSTRACT

Systems and methods are provided for enabling users to work with TimeML annotations and perform advanced temporal analysis, offering a comprehensive suite of features. Systems and methods of embodiments allow users to parse TimeML annotations, construct TimeML graphs, and execute the timeline extraction (TLEX) algorithm to effect complete timeline extraction. An algorithm can be incorporated for increasing connectivity in temporal graphs, which identifies graph disconnectivity and recommends links based on temporal reasoning, thereby enhancing the coherence of the graph representation. Also, a built-in validation algorithm can be included, ensuring compliance with TimeML annotation guidelines.

20 Claims, 6 Drawing Sheets

(56) References Cited

U.S. PATENT DOCUMENTS

2023/0344839 A1* 10/2023 Miserendino ....... H04L 63/1433
2023/0386206 A1* 11/2023 Agam .................... G06V 20/44
2024/0005098 A1*  1/2024 Choi ....................... G06F 40/30

OTHER PUBLICATIONS

Blaskovic et al., title={Modeling Constraint Satisfaction Problem With Model Checker.}, journal={Annals of DAAAM \& Proceedings}, vol. ={29}, pp. 0445-0453, year={2018} (Year: 2018).*
Xu et al., title={Formal Modeling and Verification of Timed Connectors in IoT with Z3}, booktitle={2023 Congress in Computer Science, Computer Engineering, \& Applied Computing (CSCE)}, pp. ={2556-2563}, year={2023}, IEEE (Year: 2023).*
Ocal, Mustafa et al. "Holistic Evaluation of Automatic TimeML Annotators." Proceedings of the Thirteenth Language Resources and Evaluation Conference. pp. 1444-1453, Jun. 2022.
Ocal, Mustafa et al. "A Comprehensive Evaluation and Correction of the TimeBank Corpus." Proceedings of the Thirteenth Language Resources and Evaluation Conference. pp. 2919-2927, Jun. 2022.
Ocal, Mustafa et al."jTLEX: a Java Library for TimeLine EXtraction." Proceedings of the 17th Conference of the European Chapter of the Association for Computational Linguistics: System Demonstrations. pp. 27-34, May 2023.

* cited by examiner

```
node1 = TimeX(1, "FUTURE_REF", True, "
    next wednesday")
node2 = TimeX(2, "FUTURE_REF", True, "
    next thursday")
link1 = Link(1, "TLINK", "BEFORE", node1
    , node2)
timeML_nodes = set()
timeML_nodes.add(node1)
timeML_nodes.add(node2)
timeML_links.add(link1)
timeML_graph = Graph(timeML_nodes,
    timeML_links)
```

FIG. 4

```
timeML_graph.main_partitions
timeML_graph.subordination_partitions
```

FIG. 5

```
1 Link: {ID = 1, LinkTag = TLINK, Syntax
      = "", Temporal Relation = BEFORE,
      Origin = null
2     Related to time - Timex: {tID =
          t12, Type = DATE, Value =
          1989-10-30 , Mod = null,
          Temporal Function = true,
          Quantity = null, Frequency =
          null}
3     Event Instance - Event Instance:
4     {ID = eiid44, Tense = PAST, Aspect
          = NONE, Part of Speech = VERB,
          Polarity = POS, Modality = "
          null", Cardinality = "null",
          Signal = null
5         EVENT: eid = e1, class =
              REPORTING, stem = say}
6     }
```

FIG. 6

```
Main Timeline: {                           1
    eiid46- = 1                            2
    eiid46+ = 2                            3
    eiid48- = 3                            4
    eiid44- = 3                            5
    eiid44+ = 4                            6
    eiid48+ = 4                            7
        t12- = 5                           8
        t12+ = 6                           9
    eiid45- = 6                            10
        t10- = 7                           11
    eiid45+ = 8                            12
        t10+ = 8                           13
}                                          14
Attachment Points: {eiid46->eiid47,        15
    eiid48->eiid49}
Subordinated Timelines: {                  16
[eiid47- = 1, eiid47+ = 2],                17
[eiid48- = 1, eiid48+ = 2]}                18
```

FIG. 7

```
partitions = partition_graph(graph)
links = graph.links
Connectivity_Increaser.
    connect_partitions(partitions,len(
    links))
```

FIG. 8

```
[Graph Type: Main Graph                 1
Nodes Count = 2                         2
Links count = 2                         3
TLinkType: 2                            4
ALinkType: 0                            5
SLinkType: 0                            6
Nodes:                                  7
eiid2048, t57                           8
Links: (From -> To)                     9
(t57 BEFORE eiid2048)                  10
(eiid2048 BEFORE t57)                  11
]                                      12
```

FIG. 9

```
filepath = r"../pytlex_data/
    TimeBankCorpus/wsj_0586.tml"
Sanity_Check.sco_ALINK_rule(filepath)
Sanity_Check.orphaned_node_rule(filepath
    )
```

FIG. 10

SYSTEMS AND METHODS FOR PERFORMING TEMPORAL ANALYSIS

GOVERNMENT SUPPORT

This invention was made with government support under HR0011-21-C-0186 awarded by the Defense Advanced Research Projects Agency. The government has certain rights in the invention.

BACKGROUND

Temporal information plays a crucial role in natural language processing and text analysis. TimeML, a standard generalized markup language (SGML)-based markup language, allows the annotation of temporal information in texts, including events, temporal expressions, links, and temporal signals (see also Pustejovsky et al., TimeML: robust specification of event and temporal expressions in text, In Fifth International Workshop on Computational Semantics (IWCS-5), pages 1-11, 2023; which is hereby incorporated herein by reference in its entirety). TimeML annotations can be generated using automatic analyzers, manual annotation, or some combination of the two. TimeML annotations can be used to build temporal graphs, where nodes are events and temporal expressions, and edges are temporal relations. However, they provide only a partial ordering of events and times. Meanwhile, the global order (i.e., a timeline) is more useful for various natural language processing (NLP) applications, including question-answering systems, text summarization, and text visualization.

BRIEF SUMMARY

Embodiments of the subject invention provide novel and advantageous systems and methods for enabling users to work with TimeML annotations and perform advanced temporal analysis, offering a comprehensive suite of features. Systems and methods of embodiments allow users to parse TimeML annotations, construct TimeML graphs, and execute the timeline extraction (TLEX) algorithm to effect complete timeline extraction. An algorithm can be incorporated for increasing connectivity in temporal graphs, which identifies graph dysconnectivity and recommends links based on temporal reasoning, thereby enhancing the coherence of the graph representation. Also, a built-in validation algorithm can be included, ensuring compliance with TimeML annotation guidelines, which is essential for maintaining data quality and reliability.

In an embodiment, a system for performing temporal analysis on annotations of text can comprise: a processor; and a machine-readable medium in operable communication with the processor and having instructions stored thereon that, when executed by the processor, perform the following steps: i) receiving data comprising text and annotations of the text; ii) parsing the annotations; iii) constructing at least one temporal graph from objects of the annotations; iv) partitioning at least one temporal graph; v) transforming the at least one temporal graph to at least one point algebra (PA) graph; vi) solving the at least one PA graph to extract a timeline; vii) identifying and fixing temporal inconsistencies in the timeline; viii) calculating an indeterminacy in the timeline; ix) detecting and fixing disconnectivity in the at least one temporal graph and the timeline; x) performing corpus validation of the annotations; and/or xi) visualizing the at least one temporal graph and the timeline. The system can further comprise a display in operable communication with the processor and/or the machine-readable medium. The visualizing of the at least one temporal graph and the timeline can comprise displaying the at least one temporal graph and the timeline on the display. The annotations can be TimeML annotations, and/or the objects of the annotations can be TimeML objects. The timeline can comprise a trunk-and-branch timeline structure. The solving of the at least one PA graph can comprise using a Z3 Python library. The receiving of the data comprising text and annotations of the text can comprise receiving at least one file comprising the data (e.g., a .tml file, a JavaScript object notation (JSON)-style encoding file, and/or a plain text file). The parsing of the annotations can comprise using a Python-based parser.

In another embodiment, a method for performing temporal analysis on annotations of text can comprise: i) receiving (e.g., by a processor) data comprising text and annotations of the text; ii) parsing (e.g., by the processor) the annotations; iii) constructing (e.g., by the processor) at least one temporal graph from objects of the annotations; iv) partitioning (e.g., by the processor) at least one temporal graph; v) transforming (e.g., by the processor) the at least one temporal graph to at least one PA graph; vi) solving (e.g., by the processor) the at least one PA graph to extract a timeline; vii) identifying (e.g., by the processor) and fixing (e.g., by the processor) temporal inconsistencies in the timeline; viii) calculating (e.g., by the processor) an indeterminacy in the timeline; ix) detecting (e.g., by the processor) and fixing (e.g., by the processor) disconnectivity in the at least one temporal graph and the timeline; x) performing (e.g., by the processor) corpus validation of the annotations; and/or xi) visualizing (e.g., by the processor) the at least one temporal graph and the timeline. The visualizing of the at least one temporal graph and the timeline can comprise displaying the at least one temporal graph and the timeline on a display (e.g., a display in operable communication with the processor). The annotations can be TimeML annotations, and/or the objects of the annotations can be TimeML objects. The timeline can comprise a trunk-and-branch timeline structure. The solving of the at least one PA graph can comprise using a Z3 Python library. The receiving of the data comprising text and annotations of the text can comprise receiving at least one file comprising the data (e.g., a .tml file, a JSON-style encoding file, and/or a plain text file). The parsing of the annotations can comprise using a Python-based parser.

DETAILED DESCRIPTION

Embodiments of the subject invention provide novel and advantageous systems and methods for enabling users to work with TimeML annotations and perform advanced temporal analysis, offering a comprehensive suite of features. TimeML is a standardized markup language for temporal information in text. Systems and methods of embodiments allow users to parse TimeML annotations, construct TimeML graphs, and execute the timeline extraction (TLEX) algorithm to effect complete timeline extraction (see also Finlayson et al., Extracting and aligning timelines, In Computational Analysis of Storylines: Making Sense of Events, page 87, Cambridge University Press, 2021; which is hereby incorporated herein by reference in its entirety). In contrast to related art implementations (i.e., jTLEX for Java), embodiments of the subject invention are set apart by a range of advanced features, including introducing a react-based visualization system, enhancing the exploration of temporal data, and the comprehension of temporal connections within textual information. Further, an algorithm can be incorporated for increasing connectivity in temporal graphs, which identifies graph disconnectivity and recommends links based on temporal reasoning, thereby enhancing the coherence of the graph representation. Additionally, a built-in validation algorithm can be included, ensuring compliance with TimeML annotation guidelines, which is essential for maintaining data quality and reliability. Users (e.g., researchers and developers) can be equipped with an extensive toolkit for temporal analysis, and testing across various datasets validates the accuracy and reliability of embodiments of the subject invention. Systems and methods of embodiments of the subject invention can be referred to herein as pyTLEX (Python library for timeline extraction) and can include implementation of the TLEX algorithm.

Embodiments of the subject invention can include any or all of the following 10 techniques to analyze TimeML annotations: (1) parsing TimeML annotations; (2) constructing a graph from TimeML objects; (3) partitioning the temporal graphs; (4) transforming the temporal graphs to point algebra (PA) graphs; (5) solving the PA graphs to extract a timeline; (6) identifying and fixing the temporal inconsistencies; (7) calculating indeterminacy in timelines; (8) detecting and fixing disconnectivity in graphs and timelines; (9) performing TimeML corpus validation; and/or (10) visualizing graphs and timelines of the text.

In order to effect the extraction of timelines from TimeML annotations, the TLEX algorithm can be used. TLEX is based on constraint satisfaction problems (CSPs) and provides an exact solution to the problem (in contrast to machine-learning-based approaches). TLEX converts TimeML annotations into an exact timeline, and jTLEX is an open-source Java library that implements the TLEX algorithm (see also Ocal et al., jTLEX: a Java library for TimeLine EXtraction. In Proceedings of the 17th Conference of the European Chapter of the Association for Computational Linguistics: System Demonstrations, pages 27-34, Dubrovnik, Croatia, Association for Computational Linguistics, 2023; which is hereby incorporated herein by reference in its entirety). JTLEX not only parses TimeML annotations but also allows users to manipulate TimeML graphs. As with jTLEX, pyTLEX also takes a TimeML annotated file as input, and pyTLEX can then (1) parse the annotations into TimeML objects, (2) build a TimeML graph, (3) partition the TimeML graph into temporally connected graphs to separate real-life events and subordinated events, (4) transform the temporally connected graphs into PA graphs, and (5) solve the PA graphs to extract a timeline. If a timeline cannot be extracted, meaning the graph is temporally inconsistent, pyTLEX can (6) detect the minimum inconsistent subgraph and return it to the annotator to fix it. If the order of events and times are indeterminant (multiple possible ordering), pyTLEX can (7) calculate the temporal indeterminacy.

Systems and methods of embodiments of the subject invention go beyond jTLEX and introduce several new features, including a React-based application for graph and timeline visualization, making the exploration of temporal data more intuitive and insightful. The library can incorporate an algorithm for automatically increasing connectivity, which can detect graph disconnectivity and automatically suggest temporal links. Additionally, pyTLEX can offer a rule-based system for validating compliance with the annotation guidelines.

Systems and methods of embodiments of the subject invention offer comprehensive processing and manipulation capabilities for all the data present within a TimeML annotation. They accommodate various input sources, allowing the incorporation of TimeML annotations from a .tml file, a JavaScript object notation (JSON)-style TimeML encoding, or plain text. Users can also create TimeML annotations manually, adhering to the TimeML annotation guide, or generate annotations automatically using advanced TimeML annotators like TARSQI, ClearTK, CAEVO, or CATENA (see also; Sauri et al., TimeML annotation guidelines, version 1.2.1., catalog.ldc.upenn.edu/docs/LDC2006T08/ timeml_annguide_1.2.1.pdf, 2006; Verhagen et al., Automating temporal annotation with tarsqi, In ACL, pages 81-84, 2005; Bethard, Cleartk-timeml: A minimalist approach to tempeval, In Second joint conference on lexical and computational semantics (*SEM), volume 2: proceedings of the seventh international workshop on semantic evaluation (SemEval 2013), pages 10-14; Chambers et al., Dense event ordering with a multi-pass architecture, Transactions of the Association for Computational Linguistics, 2:273-284, 2014; Mirza et al., Catena: Causal and temporal relation extraction from natural language texts, In Proceedings of COLING 2016, the 26th International Conference on Computational Linguistics: Technical Papers, pages 64-75, 2016; all five of which are hereby incorporated by reference herein in their entireties). Automatic TimeML annotation tools, while efficient, may introduce limitations such as information loss, temporal inconsistencies, and incorrect annotations. One advantage of pyTLEX lies in its ability to detect and rectify such issues, as described herein.

PyTLEX can include a TimeML parser (or TimeML parser module) for transforming TimeML annotations into a collection of TimeML objects or the raw text. PyTLEX can also validate annotation compliance with the standard.

Figure 1:
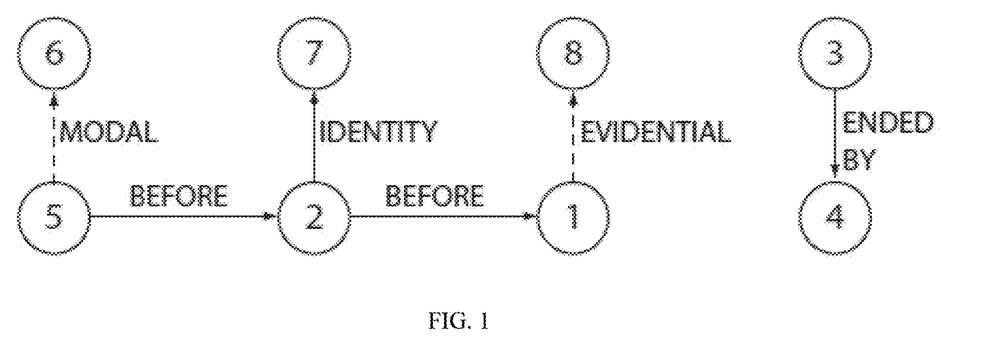
FIG. 1 shows a visualization of a TimeML (time markup language) graph for wsj_0555.tml from the TimeBank corpus, according to an embodiment of the subject invention. SLINKs are given in dashed lines. The Python library for timeline extraction (pyTLEX) system can partition the TimeML graph into four temporally connected subgraphs.

PyTLEX can include a graph constructure (or graph constructor module). In a TimeML graph, nodes correspond to events and times, and edges represent TimeML links, as illustrated in FIG. 1. This graph encapsulates a wealth of information that can be programmatically queried, including sets of links and nodes, specific links by their identification (ID), nodes by their ID, and lists of incoming or outgoing links, among other properties. PyTLEX also allows users to programmatically modify the TimeML graph. Users can introduce or remove links and nodes within the graph, allowing them to create custom graphs. The graph implementation can be exported as, for example, a JSON file, which can later be used for visualization. An example of a TimeML graph is shown in FIG. 1.

PyTLEX can include a partitioner (or a partitioner module). There are three types of TimeML links: <TLINK> and <ALINK> signify temporal order between events and times, while <SLINK> conveys modal, counterfactual, or conditional relationships between two events, as in the example "Tyler forgot to bring his wallet." In this instance, a counterfactual relationship exists between the events "forgot" and "bring". The event "bring" never transpired in the "real world" described in the text. PyTLEX can partition a TimeML graph into temporally connected subgraphs to identify such distinctions. The subgraph(s) containing "real world" events are called the main subgraph(s) and those connected to the main subgraphs via subordination links as subordinated subgraphs.

Figure 2:
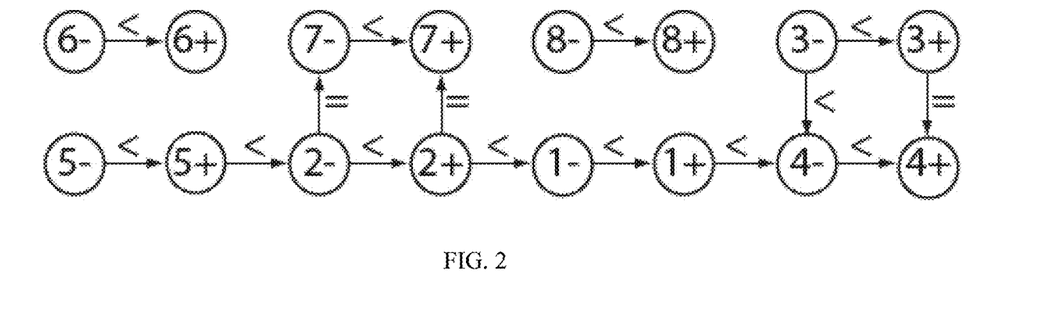
FIG. 2 shows a visualization of the output of the transforming temporally connected subgraphs in FIG. 1 into the point algebra (PA) graph after the connectivity increaser added the before link between 1 and 4.

PyTLEX can include a transformer (or a transformer module). As described in the TLEX algorithm, pyTLEX can convert each temporally connected subgraph into a PA graph, where nodes are time points, and edges are primitive temporal constraints <, =. For example, if there are two events (A and B) with A being BEFORE B, this relationship can be translated into a PA graph as A−<A+<B−<B+, with '−' and '+' marking the start and end time points of a node. FIG. 2 shows the PA graph for the TimeML graph in FIG. 1. The PA graph is necessary for the temporal constraint satisfaction problem (TCSP) that is used to generate the timeline, as discussed in the following paragraph.

PyTLEX can include a solver (or a solver module). Once each temporally connected subgraph is transformed into a PA graph, pyTLEX can use the Z3 Python library for CSPs to assign integers to the time points within the graph. The timeline can then be obtained by sorting these assigned integers. The Z3 Python library is a theorem prover and solver that is commonly used for solving complex mathematical and logical problems (see also, De Moura et al, Z3: An efficient smt solver. In International conference on Tools and Algorithms for the Construction and Analysis of Systems, pages 337-340, Springer, 2008; which is hereby incorporated herein by reference in its entirety). By default, pyTLEX generates the smallest solution where the first time point is assigned "1" and each subsequent time point the next lowest integer. When applied to all the PA graphs, pyTLEX can generate an exact trunk-and-branch timeline structure, where the trunk corresponds to the main timeline representing the main subgraph, and branches represent subordinated timelines associated with the subordinated subgraphs, as visualized in FIG. 3. Therefore, the main timeline can convey the global order of "real world" events and times, while subordinated branches capture subordinated events. Users can extract various details from the timeline, such as its length, the first and last time points, the main timeline, subordinated branches, the count of subordinated branches, the number of time points, and/or the list of attachment time points where subordinated branches connect to the main timeline.

PyTLEX can include an inconsistency detector (or an inconsistency detector module). The annotation must be consistent for the solver to extract a timeline. pyTLEX can incorporate an inconsistency detection mechanism designed to identify inconsistent cycles in the TimeML graph. In such cases, pyTLEX can identify the specific links responsible for the inconsistency, thereby enabling users to correct their annotations.

Figure 3:
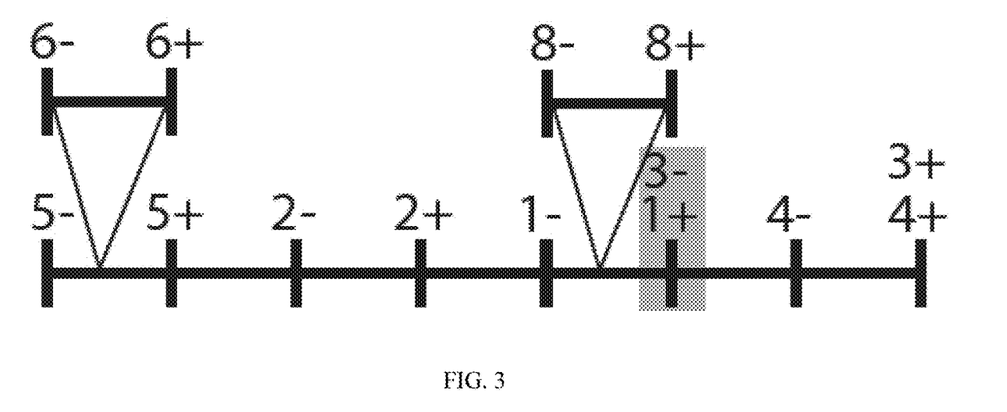
FIG. 3 shows a visualization of the timeline of the TimeML graph in FIG. 1. Grey regions indicate indeterminate sections.

PyTLEX can include an indeterminacy calculator (or an indeterminacy calculator module). In many cases, natural language texts lack sufficient information to establish a unique ordering of events and times, resulting in multiple possible global orderings. As illustrated in FIG. 2, there is no information regarding the relative order between 1+ and 3−. PyTLEX can employ the TLEX algorithm to quantify temporal indeterminacy within a timeline. The algorithm can explore and compare the shortest timeline with many (e.g., 100, about 100, or at least 100) alternative timelines (exhaustive computation of all possible timelines is computationally burdensome). If two adjacent points in the shortest timeline are not adjacent in all the other timelines, their order is indeterminate, and such sections can be marked as depicted in FIG. 3.

PyTLEX can include an increasing connectivity mechanism (or an increasing connectivity module). During TimeML annotation, it is not uncommon for annotators to unintentionally overlook the annotation of temporal links. Such omissions can lead to disconnectivity within the TimeML graph, thereby disrupting the integrity of the timeline. pyTLEX can integrate an algorithm to address this problem (see also, Radas et al., A comprehensive evaluation and correction of the timebank corpus, In Proceedings of the Language Resources and Evaluation Conference, pages 2919-2927, Marseille, France, European Language Resources Association, 2022; which is hereby incorporated herein by reference in its entirety). This algorithm can leverage temporal reasoning to intelligently propose temporal links between two disconnected subgraphs. In essence, it can undertake a comparison of the temporal expressions within these subgraphs and, based on the evaluation of time values, automatically recommend the addition of temporal links. This not only streamlines the timeline generation process but also ensures the coherence and connectivity of temporal relationships within the annotated text. For example, in FIG. 1, the TimeML graph is disconnected. Using the time values of 1 and 4, pyTLEX can suggest that 1 is BEFORE 4; inserting such a link results in a connected timeline, as shown in FIG. 3.

PyTLEX can include a validation mechanism (or a validation module). The TimeML annotation guide establishes a set of rules governing the structure of TimeML annotations (see also (Sauri et al., supra.). PyTLEX can incorporate these as a rule-based system that can scrutinize TimeML annotations and ensure compliance with those defined rules. The validation mechanism can incorporate the algorithm mentioned above to assess adherence to Rules 1 to 6 (see also Radas et al., supra.). Further, pyTLEX can use another algorithm to verify compliance with Rule 7 (see also, Derczynski et al., Analysing temporally annotated corpora with cavat, arXiv preprint arXiv: 1203.5051, 2012; which is hereby incorporated herein by reference in its entirety). In addition, pyTLEX can perform checks to identify instances of repeating links within the TimeML graph (Rule 8), reinforcing the integrity of the annotation.

PyTLEX can include a visualization mechanism (or a visualization module). In order to visualize its JSON outputs, pyTLEX can provide a React-based application that allows users to visually explore the TimeML graph, its partitions, and/or the resulting timelines. Also, the visualization application can harness the output from the inconsistency detector to highlight problematic links within the graph. This visual aid can empower users to readily identify issues and undertake necessary corrections. Further, pyTLEX can incorporate visual cues to highlight indeterminate sections of the timeline, making it a valuable resource for narrative comprehension and understanding (see also cognac.cs.fiu.edu/pytlex/).

Systems and methods of embodiments of the subject invention can analyze TimeML annotated texts and can be implemented in Python. Multiple different inputs can be received (e.g., three different inputs, such as a .tml file, a JSON-style TimeML encoding, and/or plain text). A Python-based parser can be used to parse the document into TimeML objects. The users can also create their own TimeML objects, or manipulate existing TimeML objects. Graphs can then be built using the TimeML objects. Using the TLEX algorithm, the graph can be partitioned, the graph can be transformed into a PA graph, the PA graph can be solved and a timeline can be extracted, and the indeterminacy score of the timeline can be calculated. If the annotation includes inconsistencies, they can be detected and fixed (e.g., using a solver, such as a Z3 solver). The algorithm can detect disconnectivity in TimeML graphs and, using TIMEX values of disconnected subgraphs, it can automatically fix the disconnectivity. A rule-based system can also be implemented to check seven strict TimeML rules in the annotations for corpus validation. A React-based application can also be used for TimeML graph and timeline visualization.

Related art systems and methods all have shortcomings. In addition to related art TimeML tools, machine learning-based techniques have been used by NLP researchers for timeline extraction from TimeML annotations. These approaches come with specific constraints, and none of them address all temporal links, covering a maximum of six out of the 13 types. Additionally, they fail to distinguish between real-life events and subordinated events, and they may not effectively handle temporal indeterminacy within the annotations.

In contrast to related art systems and methods, pyTLEX provides an open-source implementation of TLEX, a technique for extracting exact timelines from TimeML annotations. PyTLEX incorporates a TimeML parser and a graph constructor. It distinguishes subordinated events from real-world events, extracts the global order of events and times in a trunk-and-branch timeline structure, automatically identifies and rectifies inconsistencies, and identifies and gauges indeterminacy. However, pyTLEX has a number of extended capabilities. It not only detects and resolves disconnectivities within both graphs and timelines but also integrates a validation system for TimeML annotations. Additionally, it offers a visualization system, enhancing comprehension for users.

Embodiments of the subject invention provide Python libraries (e.g., open-source Python libraries) that enable the programmatic extraction of exact timelines from TimeML-annotated texts via a standard Python application programming interface (API). PyTLEX provides several capabilities, including TimeML parsing, graph extraction, timeline generation, inconsistency identification, temporal indeterminacy assessment, disconnectivity detection and resolution, corpus validation, and advanced visualization capabilities.

Embodiments of the subject invention provide several advantages over the related art, including but not necessarily limited to: providing the first-ever Python library for timeline extraction; providing automatic TimeML corpus validation for the first time; detecting disconnectivity in temporal graphs and also resolving them by automatically suggesting links between disconnected parts; detecting inconsistency in TimeML annotations and semi-automatically fixing them; providing TimeML parsing and manipulation; and providing the first-ever visualization system for TimeML graphs and timelines.

Embodiments of the subject invention provide a focused technical solution to the focused technical problem of how to perform temporal analysis on TimeML annotations of text. The solution is provided by parsing TimeML annotations, constructing at least one temporal graph from TimeML objects, partitioning the at least one temporal graph, transforming the at least one temporal graph to at least one PA graph, solving the at least one PA graph to extract a timeline, identifying and fixing temporal inconsistencies in the timeline, calculating an indeterminacy in the timeline, detecting and fixing disconnectivity in the at least one temporal graph and the timeline, performing TimeML corpus validation, and/or visualizing the at least one temporal graph and the timeline. Embodiments of the subject invention can improve the computer system performing the temporal analysis by efficiently performing the analysis compared to related art systems (this can free up memory and/or processor usage).

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

When the term module is used herein, it can refer to software and/or one or more algorithms to perform the function of the module; alternatively, the term module can refer to a physical device configured to perform the function of the module (e.g., by having software and/or one or more algorithms stored thereon).

When ranges are used herein, combinations and subcombinations of ranges (including any value or subrange contained therein) are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

PyTLEX was used for one of the TimeML annotations of the TimeBank corpus, a file called wsj_0555.tml, which can be obtained (along with the rest of the corpus) from the Linguistic Data Consortium (LDC) website (catalog.ldc.upenn.edu/LDC2006T08). The following text, shown in the example below, is a snippet of the TimeML-annotated text of wsj_0555.tml. The TimeML graph corresponding to the snippet text is shown in FIG. 1, where it can seen that the nodes of the graph are either events or times, and the edges are TimeML relations. Event instance IDs and timeIDs are given in square brackets (DCT=DOCUMENT CREATION TIME).

[DCT: Oct. 30, $1989_{1[t12]}$]: Waxman Industries Inc. $said_{2[ei44]}$ holders of $6,542,000 face amount of its 6¼% convertible subordinated debentures, $due_{3[ei45]}$ Mar. 15, $2007_{4[t13]}$, have $elected_{5[ei46]}$ to $convert_{6[ei47]}$ the debt into about 683,000 common shares. The conversion price is $9.58 a share. The company $said_{7[ei48]}$ the holders $represent_{8[ei49]}$ 52% of the face amount of the debentures.

Figure 4:
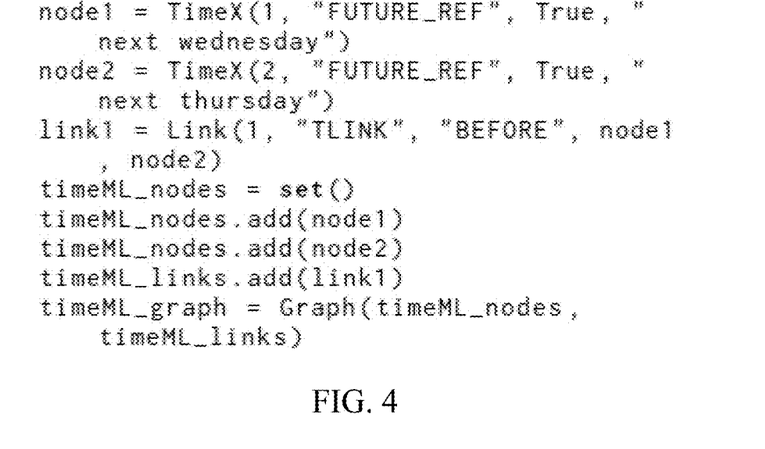
FIG. 4 shows a code snippet of a process of creating a customized graph and adding two new nodes along with a link, according to an embodiment of the subject invention.
Figure 5:
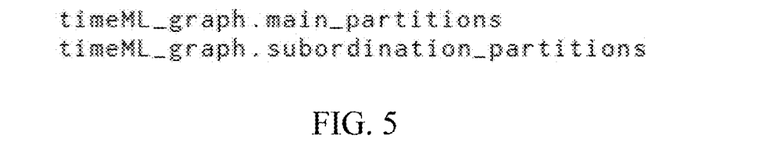
FIG. 5 shows a code snippet of a process of accessing a graph's partitions, according to an embodiment of the subject invention.
Figure 6:
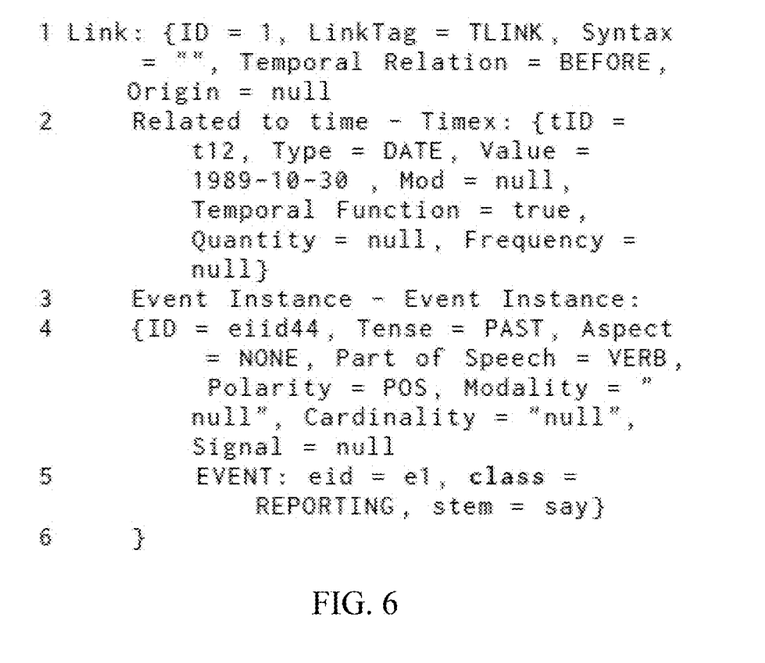
FIG. 6 shows pyTLEX parser output for printing information about a first link of a graph, according to an embodiment of the subject invention.

Users can read the file and create the TimeML graph as follows: timeML_graph=Graph ('wsj_0555.tml'). Users can retrieve any information about the graph, such as links (all or one by ID), nodes (all or one by ID), incoming links, outgoing links, JSON output, number of nodes, number of links, number of link types, etc. The listing in FIG. 6 shows the output of pyTLEX when the user requests the information about the first link of wsj_0555.tml. Moreover, users can actively manipulate their graph by adding or removing nodes and links or even constructing entirely custom graphs. The code snippet shown in FIG. 4 demonstrates the process of creating a customized graph and adding two new nodes along with a link. After the TimeML graph is created, users can perform timeline extraction. Accessing the graph's partitions can be achieved as shown in FIG. 5.

Figure 8:
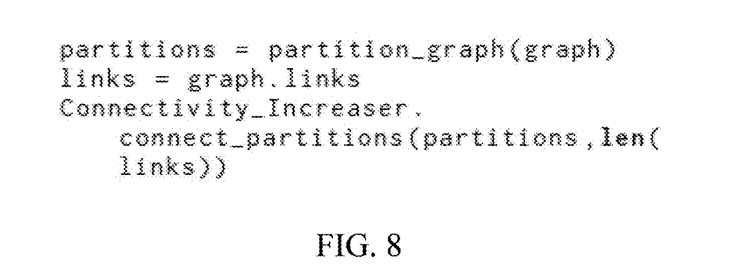
FIG. 8 shows a code snippet for incorporating a suggested link, thereby achieving a fully connected graph and, by extension, a fully connected timeline, according to an embodiment of the subject invention.

As can be seen from FIG. 1, this TimeML graph has disconnectivity. PyTLEX can automatically propose a link based on the values of t12 (Oct. 30, 1989) and t10 (Mar. 15, 2007) through the use of the algorithm for increasing connectivity. Consequently, pyTLEX suggests the link "t12-BEFORE→t10" to the user. Users have the option to incorporate this suggested link, thereby achieving a fully connected graph and, by extension, a fully connected timeline, as shown in FIG. 8.

Figure 7:
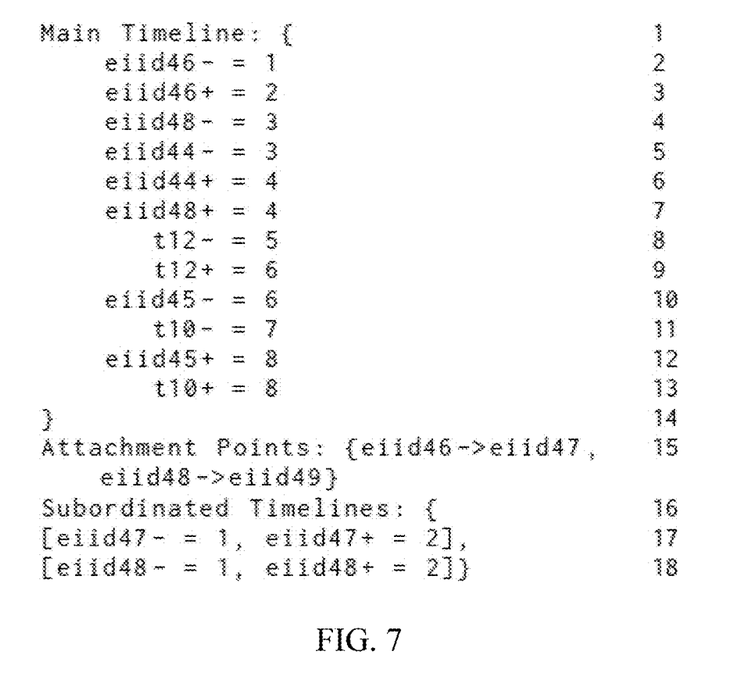
FIG. 7 shows pyTLEX timeline output for a wsj_0555.tml file, according to an embodiment of the subject invention.

Now that there is a fully connected graph, the timeline can be extracted. Users can retrieve the exact trunk-and-branch timeline structure using: timeML_graph.timeline. The output will be as shown in the listing in FIG. 7. As can be seen, pyTLEX returns the main timeline, subordinated timelines, and the attachment points for each subordinated timeline.

Figure 10:
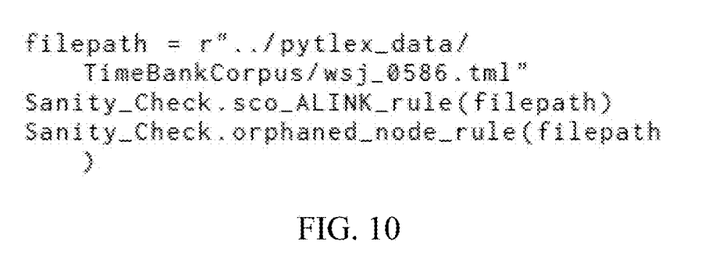
FIG. 10 shows a code snippet for validating annotations, according to an embodiment of the subject invention.

After extracting the timeline, users can also retrieve the indeterminacy score, as well as the indeterminant time points. For our example, pyTLEX returns 0.125 indeterminacy score, and {t12+, eiid45−} indeterminant time points after running: IndeterminacyDetector.solve (g). Users can validate annotations, for example, by checking the ALINK replacement rule (Rule 4) and the orphaned node rule (Rule 7), as shown in FIG. 10.

Figure 9:
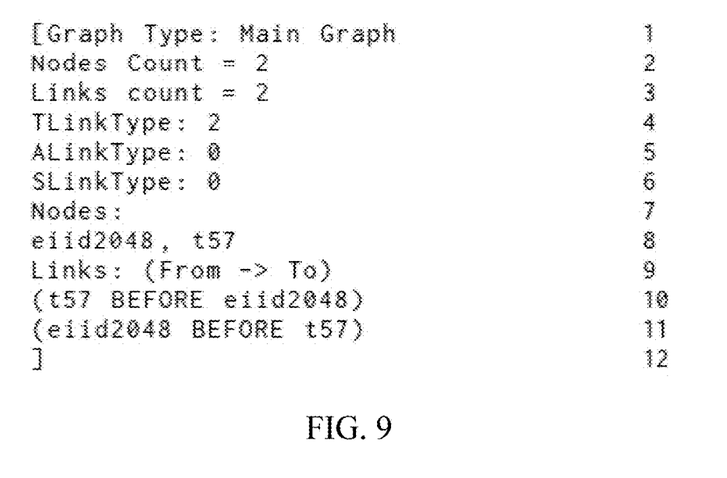
FIG. 9 shows pyTLEX inconsistent subgraph output for a wsj_1011.tml file., according to an embodiment of the subject invention.

Because the graph of wsj_0555.tml is consistent, pyTLEX's inconsistency detection method yields an empty set, indicating the absence of temporal inconsistencies. In order to elucidate the mechanics of the inconsistency detection algorithm, wsj_1011.tml can be used, which is a temporally inconsistent file from the TimeBank corpus. Following the execution of the graph construction method, users can run the generate_inconsistent_subgraphs(g) function to obtain information about the inconsistent cycle. For this specific file, pyTLEX generates an output as shown in in the listing in FIG. 9, presenting both the inconsistent subgraph and relevant subgraph details.

Example 2

PyTLEX was tested on the TimeBank corpus, which contains 183 TimeML annotated news articles (see also Hanks et al., The TimeBank corpus, In Proceedings of Corpus Linguistics Conference, pages 647-656, Lancaster, U K, 2003; which is hereby incorporated herein by reference in its entirety). In less than nine minutes on a current consumer laptop (3.0 gigahertz (GHz) Intel Core i7-1185G7 with 32 gigabytes (GB) of RAM), pyTLEX validated the annotations, extracted timelines, and visualized them. A screencast video showing the operation can be found at cognac.cs.fiu.edu/pytlex/.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for performing temporal analysis on annotations of text, the system comprising:
   a processor;
   a display in operable communication with the processor; and
   a machine-readable medium in operable communication with the processor and having instructions stored thereon that, when executed by the processor, perform the following steps:

i) receiving data comprising text and annotations of the text;
ii) parsing the annotations;
iii) constructing at least one temporal graph from objects of the annotations;
iv) partitioning the at least one temporal graph into temporally connected subgraphs to distinguish between real-world events and subordinated events in the at least one temporal graph;
v) transforming the at least one temporal graph to at least one point algebra (PA) graph;
vi) solving the at least one PA graph to extract a timeline;
vii) identifying and fixing temporal inconsistencies in the timeline;
viii) calculating an indeterminacy in the timeline;
ix) detecting and fixing disconnectivity in the at least one temporal graph and the timeline; and
x) visualizing the at least one temporal graph and the timeline by displaying the at least one temporal graph and the timeline on the display,
the receiving of the data comprising receiving at least one file comprising the data,
the at least one file comprising at least one of a .tml file, a JavaScript object notation (JSON)-style encoding file, and a plain text file,
the parsing of the annotations comprising using a parser that is configured to be able to parse annotations of a .tml file, a JSON-style encoding file, and a plain text file, and
the visualizing of the at least one temporal graph and the timeline being a react-based visualization such that a user can interact with the at least one temporal graph and the timeline in real time.

2. The system according to claim 1, the instructions when executed further performing the following step:
xi) performing corpus validation of the annotations.

3. The system according to claim 1, the annotations being TimeML annotations.

4. The system according to claim 3, the objects of the annotations being TimeML objects.

5. The system according to claim 1, the timeline comprising a trunk-and-branch timeline structure.

6. The system according to claim 1, the solving of the at least one PA graph comprising using a Z3 Python library.

7. The system according to claim 1, the parser being a Python-based parser.

8. The system according to claim 1, the at least one temporal graph comprising two or more temporal graphs,
the detecting and fixing disconnectivity in the at least one temporal graph and the timeline comprising using an algorithm to automatically increase connectivity of the two or more temporal graphs, the algorithm being configured to use temporal reasoning to determine temporal links between the two or more temporal graphs.

9. The system according to claim 1, step x) further comprising visualizing the temporally connected subgraphs by displaying the temporally connected subgraphs on the display, and
the visualizing of the temporally connected subgraphs being a react-based visualization such that a user can interact with the temporally connected subgraphs in real time.

10. A method for performing temporal analysis on annotations of text, the method comprising:
i) receiving data comprising text and annotations of the text;
ii) parsing the annotations;
iii) constructing at least one temporal graph from objects of the annotations;
iv) partitioning the at least one temporal graph into temporally connected subgraphs to distinguish between real-world events and subordinated events in the at least one temporal graph;
v) transforming the at least one temporal graph to at least one point algebra (PA) graph;
vi) solving the at least one PA graph to extract a timeline;
vii) identifying and fixing temporal inconsistencies in the timeline;
viii) calculating an indeterminacy in the timeline; and
ix) detecting and fixing disconnectivity in the at least one temporal graph and the timeline; and
x) visualizing the at least one temporal graph and the timeline by displaying the at least one temporal graph and the timeline on a display,
the receiving of the data comprising receiving at least one file comprising the data,
the at least one file comprising at least one of a .tml file, a JavaScript object notation (JSON)-style encoding file, and a plain text file,
the parsing of the annotations comprising using a parser that is configured to be able to parse annotations of a .tml file, a JSON-style encoding file, and a plain text file, and
the visualizing of the at least one temporal graph and the timeline being a react-based visualization such that a user can interact with the at least one temporal graph and the timeline in real time.

11. The method according to claim 10, further comprising:
xi) performing corpus validation of the annotations.

12. The method according to claim 10, the annotations being TimeML annotations.

13. The method according to claim 12, the objects of the annotations being TimeML objects.

14. The method according to claim 10, the timeline comprising a trunk-and-branch timeline structure.

15. The method according to claim 10, the parser being a Python-based parser, and
the solving of the at least one PA graph comprising using a Z3 Python library.

16. The method according to claim 10, the at least one temporal graph comprising two or more temporal graphs,
the detecting and fixing disconnectivity in the at least one temporal graph and the timeline comprising using an algorithm to automatically increase connectivity of the two or more temporal graphs, the algorithm being configured to use temporal reasoning to determine temporal links between the two or more temporal graphs.

17. The method according to claim 10, step x) further comprising visualizing the temporally connected subgraphs by displaying the temporally connected subgraphs on the display, and
the visualizing of the temporally connected subgraphs being a react-based visualization such that a user can interact with the temporally connected subgraphs in real time.

18. A system for performing temporal analysis on annotations of text, the system comprising:
a processor;
a display in operable communication with the processor; and a machine-readable medium in operable communication with the processor and having instructions stored thereon that, when executed by the processor, perform the following steps:
i) receiving data comprising text and annotations of the text;
ii) parsing the annotations;
iii) constructing at least one temporal graph from objects of the annotations;
iv) partitioning the at least one temporal graph into temporally connected subgraphs to distinguish between real-world events and subordinated events in the at least one temporal graph;
v) transforming the at least one temporal graph to at least one point algebra (PA) graph;
vi) solving the at least one PA graph to extract a timeline;
vii) identifying and fixing temporal inconsistencies in the timeline;
viii) calculating an indeterminacy in the timeline;
ix) detecting and fixing disconnectivity in the at least one temporal graph and the timeline;
x) performing corpus validation of the annotations; and
xi) visualizing the at least one temporal graph and the timeline by displaying the at least one temporal graph and the timeline on the display,
the annotations being TimeML annotations,
the objects of the annotations being TimeML objects,
the timeline comprising a trunk-and-branch timeline structure,
the solving of the at least one PA graph comprising using a Z3 Python library, the receiving of the data comprising receiving at least one file comprising the data,
the at least one file comprising at least one of a .tml file, a JavaScript object notation (JSON)-style encoding file, and a plain text file,
the parsing of the annotations comprising using a Python-based parser that is configured to be able to parse annotations of a .tml file, a JSON-style encoding file, and a plain text file, and
the visualizing of the at least one temporal graph and the timeline being a react-based visualization such that a user can interact with the at least one temporal graph and the timeline in real time.

19. The system according to claim 18, the at least one temporal graph comprising two or more temporal graphs,
the detecting and fixing disconnectivity in the at least one temporal graph and the timeline comprising using an algorithm to automatically increase connectivity of the two or more temporal graphs, the algorithm being configured to use temporal reasoning to determine temporal links between the two or more temporal graphs.

20. The system according to claim 18, step xi) further comprising visualizing the temporally connected subgraphs by displaying the temporally connected subgraphs on the display, and
the visualizing of the temporally connected subgraphs being a react-based visualization such that a user can interact with the temporally connected subgraphs in real time.

* * * * *